HIGH CURRENT TRANSISTOR PULSER

Filed Dec. 31, 1957

INVENTORS L. W. HUSSEY
F. A. SAAL
BY
S.E. Hollander
ATTORNEY

United States Patent Office
3,060,324
Patented Oct. 23, 1962

3,060,324

HIGH CURRENT TRANSISTOR PULSER

Luther W. Hussey, Sparta, and Frederick A. Saal, Elizabeth, N.J., assignors to Bell Telephone Laboratories, Incorporated, New York, N.Y., a corporation of New York Filed Dec. 31, 1957, Ser. No. 706,423
10 Claims. (Cl. 307—88.5)

This invention relates to electrical pulsing circuits and more particularly to high current transistor blocking oscillators.

In general practice the power output of conventional transistors is quite limited when compared to vacuum tube devices. Although special power transistors capable of delivering several watts have been developed, the output capability of ordinary transistors is often measured in milliwatts. Correspondingly, the absolute maximum collector current ratings are usually designated in milliamperes, and the output impedances are specified in thousands of ohms.

It is an object of this invention to obtain output current pulses of several amperes from a transistor whose ordinary absolute maximum output current rating is one or more orders of magnitude (ten or more times) lower.

An additional object of this invention is to obtain balanced operation of a plurality of blocking oscillators.

A further object of this invention is to provide a reliable, economical high current transistor pulser.

A feature of this invention is the serial connection of a load device and the emitter electrode.

A further feature of this invention is the utilization of a load device requiring a current substantially exceeding the absolute maximum current rating of the transistor.

An additional feature of this invention is the utilization of a load device having an impedance one or more orders of magnitude (ten or more times) lower than that required to draw the rated absolute maximum current from the transistor.

Still another feature of this invention is the use of paralleled transistor blocking oscillators having independent feedback windings.

A further feature of this invention is the use of an input signal to the base of only one transistor, to trigger a plurality of parallel connected blocking oscillators.

Still another feature of this invention is the use of a regenerative arrangement for supplying a drive current substantially exceeding that required to produce the rated maximum output current.

These and other objects and features of the invention may be realized in an illustrative embodiment in which two transistors are connected in a parallel blocking oscillator configuration. The collector electrodes are paralleled to a transformer primary winding. The load is connected in series with the paralleled emitter electrodes. Feedback windings comprising separate halves of the transformer secondary are individually coupled to the transistor base electrodes. A trigger signal through a capacitor to the base of one of the transistors initiates triggering of both. The individual feedback coils contribute toward equalization of the load on each of the blocking oscillators.

Figure 1:
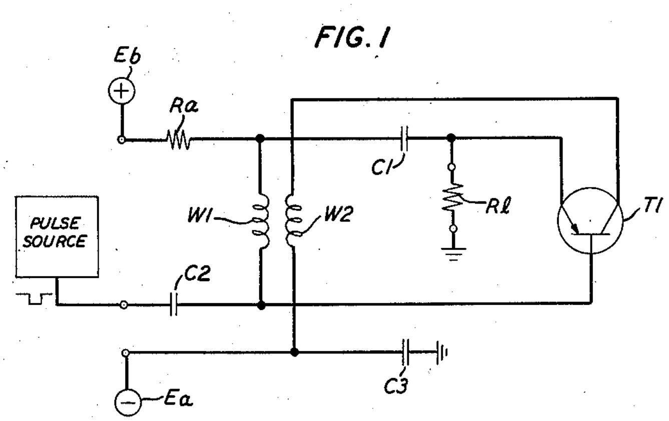
Figure 2:
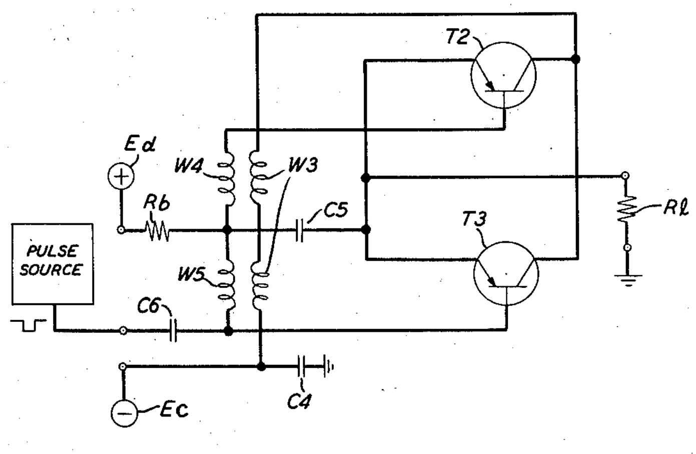

The above-recited and other objects and features of the invention may be more fully comprehended by referring to the following specification, appended claims and attached drawing in which:

FIG. 1 is an illustrative embodiment of the invention showing a single transistor device and the serial connection of the load in the emitter circuit; and FIG. 2 shows another illustrative embodiment of the invention in which two transistor devices are connected in parallel with separate feedback to the base electrodes.

Referring now to FIG. 1, a blocking oscillator circuit is shown in which the load R*l* is connected in series with the transistor emitter circuit. Capacitor C1 provides a low impedance feedback path. Capacitor C3 stores energy between pulses and serves as a low impedance source. The positive voltage from source E*b* normally reverse biases the base-emitter junction, placing the transistor in the high impedance or "off" condition.

In operation, a negative pulse is applied from the pulse source, shown symbolically, through capacitor C2 to the base electrode of transistor T1 to initiate transistor action by forward biasing the base-emitter junction. Variations in collector current flow are regeneratively coupled back to the base electrode through windings W2 and W1. An output pulse is produced across load resistance R*l*.

As illustrative of the values which the circuit parameters may take, the following exemplary tabulation is offered:

C1=50 microfarads
C2=0.001 microfarad
C3=100 microfarads
E*a*=−12 volts
E*b* =+3 volts
R*l*=2Ω
R*a*=20Ω
T1=Western Electric 14A or the like
$\alpha$=0.97
$F_\alpha$ (cutoff frequency)=6 mc.
Max. rated emitter current=100 ma.

With the values above indicated, current pulses exceeding 3 amperes and of 8 microseconds duration, are readily obtainable.

Referring now to FIG. 2, two parallel connected transistors T2 and T3 are shown.

Capacitor C4, performing a function similar to that of C3 of FIG. 1, supplies almost the entire pulse current. Thus, the power source E*c* need only supply a direct-current equal to the averaged output current plus the leakage currents.

Capacitor C5 provides a low impedance path for the feedback current and may also be used to determine the pulse length. This follows since capacitor C5 accumulates a charge voltage as the feedback current flows through it, and the voltage thus developed tends to cut off the transistors by reverse biasing the base-emitter junction.

The positive voltage from source E*d* through resistance R*b* normally biases the transistors in the high impedance or "off" condition. Since the discharge path for capacitor C5 is from ground through R*l* and R*b* and since (as shown herein) R*b* is much greater than R*l*, the maximum repetition rate is determined by the time constant R*b*C5.

In operation, negative triggering pulses from the pulse source are coupled through capacitor C6 to the base electrodes of transistors T2 and T3 forward biasing the base-emitter junctions thereof. Variations in current flow through winding W3 are regeneratively coupled through windings W4 and W5 to the base electrodes causing a sharp current pulse to appear across the output load resistance R*l*.

As illustrative of the values that the circuit parameters of FIG. 2 may take, the following exemplary values are given:

C4=100 microfarads
C5=0.25 microfarad
C6=0.003 microfarad
R*b*=100 ohms
R*l*=4 ohms
E*c*=−15 volts
E*d*=+1½ volts
T2, T3=Western Electric 14A or the like
$\alpha \geqslant 0.9$ at 2 amp. collector current
$F_\alpha$ (cutoff frequency)$\geqslant$4 mc.
Max. rated emitter current=100 mils With the values above indicated, negative pulses from the pulse source of 15 milliamperes at 1.5 volts produce a 4 microsecond output pulse of 3 amperes magnitude.

The extremely high current capabilities of the present invention may be due, in part, to conductivity modulation. This phenomenon manifests itself when, at high current levels, the emitter injects into the base region a number of carriers greatly exceeding the normal free carriers in the base. The conductivity of the base is then determined by the injected carriers rather than the normal base carriers. The base resistance is accordingly lowered and becomes a function of the injected current.

The lowered resistance permits the handling of high currents and also reduces the internal dissipation of the transistor.

Empirical investigation indicates that transistors having a high $\alpha$ cutoff frequency (the frequency at which alpha drops to a point 3 decibels below its low frequency value) are well suited for the practice of the present invention. Also, since the current gain, $\alpha$ (the ratio of change in collector current to a change in emitter current with constant collector voltage) decreases as the collector current increases, transistor units having a small variation in $\alpha$ with respect to current are desirable.

It is therefore advantageous in the practice of this invention, but not a fundamental requisite thereof, to employ transistor units having both of the above qualities, viz., a high alpha cutoff frequency and a small drop in alpha at increased transistor currents.

Moreover, the output currents described above in the cases of FIGS. 1 and 2 are conservative in relation to the currents available using the configuration shown. For example, by lowering the impedance of the load to a very low value, output currents as high as 15 amperes are obtainable without damage to the transistors. This phenomenon obtains despite the fact that the absolute maximum current ratings are more than two orders of magnitude lower (more than 100 times lower) than 15 amperes.

It is also feasible to operate the transistors at current levels lower than those specifically enumerated, for example, in the range of approximately two to ten times the maximum current ratings.

It follows from the arrangement of the circuit of FIG. 1 that in order to obtain an output of 15 amperes, with an alpha of 0.90, for example, the input current to the base electrode must be in the range of 1.5 amperes. In consequence of the regenerative arrangement shown, however, the triggering current from the pulse source may be much lower than 1.5 amperes.

In the following claims, an order of magnitude refers to a factor of 10. For example, one order of magnitude higher is 10 times higher. Two orders of magnitude lower would be 100 times lower, etc.

It is understood that the embodiments and values shown are merely exemplary and that various modifications may be made by those skilled in the art without departing from the scope of the present invention.

What is claimed is:

1. A transistor pulsing device including a base, emitter and collector electrode, a utilization circuit connected in series with said emitter electrode, said utilization circuit being characterized by a current requirement substantially 2900 percent higher than the maximum rated emitter current of said transistor, means for supplying operating potentials to said base and collector electrodes, and pulsing means for delivering a pulse of current to said base electrode substantially 2900 percent higher than that necessary to produce maximum rated emitter current to drive a pulse of the required magnitude through said utilization circuit for a period of at least 8 microseconds.

2. A transistor pulsing device including a base, emitter and collector electrode, a utilization circuit connected in series with said emitter electrode, said utilization circuit having an impedance substantially ten or more times lower than that required to draw maximum rated emitter current, means for supplying operating potentials to said base and collector electrodes, and pulsing means for delivering a pulse of current to said base electrode substantially one or more orders of magnitude higher than that required to produce maximum rated emitter current to drive a pulse substantially ten or more times higher than the maximum rated emitter current through said utilization circuit for a duration of at least 4 microseconds.

3. A transistor pulse generator including a plurality of transistors each having a base, emitter and collector electrode, means for interconnecting said emitter electrodes, means for interconnecting said collector electrodes, a utilization circuit connected in series with said interconnected emitter electrodes, said utilization circuit being characterized by a current requirement substantially exceeding the combined maximum rated output currents of said transistors, means for supplying operating potentials to said base and collector electrodes, means for individually regeneratively coupling said collector electrodes to the respective associated base electrodes, and pulsing means connected to one of said base electrodes and adapted in cooperation with said generator to deliver a pulse of current to said base electrodes substantially exceeding the base current necessary to produce maximum rated output current, thereby driving a pulse of the required level through said utilization circuit.

4. A transistor pulse generator including a plurality of transistors each having a base, emitter and collector electrode, means for interconnecting said emitter electrodes, means for interconnecting said collector electrodes, a utilization circuit connected in series with said interconnected emitter electrodes, said utilization circuit being characterized by an impedance substantially lower than that required to draw the combined maximum rated output current from said transistors, means for supplying operating potentials to said base and collector electrodes, means for individually regeneratively coupling said collector electrodes to the respective associated base electrodes, and pulsing means connected to one of said base electrodes and adapted in cooperation with said generator to deliver a pulse of current to said base electrodes substantially exceeding the base current needed to produce maximum rated output current, thereby driving a pulse substantially exceeding the maximum rated output current through said utilization circuit.

5. A transistor pulse generator including a plurality of transistors each having a base, emitter and collector electrode, means interconnecting said collector electrodes, means interconnecting said emitter electrodes, a utilization circuit connected in series with said interconnected emitter electrodes, said utilization circuit requiring a current substantially one or more orders of magnitude higher than the combined rated maximum emitter current of said transistors, means for supplying operating potentials to said base and collector electrodes, means for individually regeneratively coupling said collector electrodes to the respective associated base electrodes, and pulse supply means connected to one of said base electrodes and adapted in cooperation with said generator for delivering a pulse of current to said base electrodes substantially one or more orders of magnitude higher than the base current necessary to produce maximum rated emitter current, thereby driving a pulse of the required level through said utilization circuit.

6. A transistor pulse generator including a plurality of transistors each having a base, emitter and collector electrode, means interconnecting said collector electrodes, means interconnecting said emitter electrodes, a utilization circuit connected in series with said interconnected emitter electrodes, said utilization circuit having an impedance substantially ten or more times lower than that required to draw the combined maximum rated emitter currents, means for supplying operating potentials to said base and collector electrodes, means for individually regeneratively coupling said collector electrodes to said associated base electrodes, and pulse supply means connected to one of said base electrodes and adapted in cooperation with said generator for delivering a pulse of current to said base electrodes substantially ten or more times higher than the base current necessary to produce maximum rated emitter current, thereby driving a pulse substantially one to two orders of magnitude higher than the combined maximum rated emitter currents through said utilization circuit.

7. A transistor pulse generator including a plurality of transistors each having a base, emitter and collector electrode, means interconnecting said collector electrodes, means interconnecting said emitter electrodes, a utilization circuit connected in series with said interconnected emitter electrodes, said utilization circuit being characterized by a current requirement substantially ten to one hundred times higher than the combined maximum rated output current of said transistors, means for supplying operating potentials to said base and collector electrodes, means for individually regeneratively coupling said collector electrodes to said associated base electrodes, and pulsing means connected to one of said base electrodes and adapted in cooperation with said generator to deliver a pulse of current to said base electrodes substantially ten to one hundred times higher than the base current necessary to produce maximum rated emitter current, thereby driving a pulse of the required current level through said utilization circuit.

8. A transistor pulse generator including a plurality of transistors each having a base, emitter and collector electrode, means interconnecting said collector electrodes, means interconnecting said emitter electrodes, a utilization circuit connected in series with said interconnected emitter electrodes, sad utilization circuit having an impedance substantially ten to one hundred times lower than that required to draw the combined maximum rated emitter currents, means for supplying operating potentials to said base and collector electrodes, means for individually regeneratively coupling said collector electrodes to said associated base electrodes, and pulsing means connected to one of said base electrodes and adapted in cooperation with said generator to deliver a pulse of current to said base electrodes substantially one to two orders of magnitude higher than the base current needed to produce maximum rated emitter current, thereby driving a pulse of substantially ten to one hundred times higher than the combined rated emitter currents through said utilization circuit.

9. A transistor blocking oscillator including at least two transistors each having a base, emitter and collector electrode, means interconnecting said emitter electrodes, means interconnecting said collector electrodes, a utilization circuit connected in series with said interconnected emitter electrodes, said utilization circuit being characterized by a current requirement of ten to one hundred times higher than the combined maximum rated emitter currents of said transistors, means for supplying operating potentials to said base and collector electrodes, transformer means for individually coupling each of said collector electrodes in regenerative fashion to the respective associated base electrodes, and pulsing means connected to one of said base electrodes and adapted in cooperation with said blocking oscillator to deliver a pulse of current to said base electrodes substantially ten to one hundred times higher than the base current necessary to produce maximum rated emitter current, thereby driving a pulse of the required level through said utilization circuit.

10. A transistor pulse generator including at least two transistors each having a base, emitter and collector electrode, means interconnecting said collector electrodes, means interconnecting said emitter electrodes, a utilization circuit connected in series with said interconnected emitter electrodes, said utilization circuit being characterized by a current requirement substantially ten to one hundred times higher than the combined maximum rated emitter currents of said transistors, collector operating potential supply means, base potential supply means, a transformer including a plurality of windings, means connecting said interconnected collector electrodes through a first of said windings to said collector potential supply means, means individually connecting said base electrodes through second and third windings to said base potential supply means, means for connecting said second and third windings in series, means connecting said base potential supply means through a first capacitor means to said interconnected emitter electrodes, a second capacitor means serially connected between said collector potential supply means and a source of reference potential, a third capacitor means, and pulsing means connected to one of said base electrodes through said third capacitor means and adapted in cooperation with said generator to deliver a pulse of current to said base electrodes substantially ten to one hundred times higher than that necessary to produce maximum rated output current, thereby driving a pulse of the required level through said utilization circuit.

References Cited in the file of this patent

UNITED STATES PATENTS

| | | |
|---|---|---|
| 2,605,424 | Janvrin | July 29, 1952 |
| 2,633,530 | Wachtell | Mar. 31, 1953 |
| 2,708,241 | Bess | May 10, 1955 |
| 2,745,012 | Felker | May 8, 1956 |
| 2,772,370 | Bruce et al. | Nov. 27, 1956 |
| 2,777,092 | Mandelkorn | Jan. 8, 1957 |
| 2,787,707 | Cockburn | Apr. 2, 1957 |
| 2,810,080 | Trousdale | Oct. 15, 1957 |
| 2,816,230 | Lindsay | Dec. 10, 1957 |
| 2,848,613 | Green et al. | Aug. 19, 1958 |
| 2,850,648 | Elliott | Sept. 2, 1958 |
| 2,858,438 | Merill | Oct. 28, 1958 |
| 2,889,510 | Carmichael | June 2, 1959 |

OTHER REFERENCES

"Transistors in Switching Circuits," by Anderson, Proceedings of the I.R.E., November 1952, pages 1541–1558.